US012773949B2

(12) United States Patent
Dede et al.

(10) Patent No.: US 12,773,949 B2
(45) Date of Patent: Oct. 27, 2026

(54) REFLECTIVE PILLAR DISPLAY TO VIEW BLIND SPOT OF A VEHICLE PILLAR

(71) Applicant: Toyota Motor Engineering & Manufacturing North America, Inc., Plano, TX (US)

(72) Inventors: Ercan M. Dede, Ann Arbor, MI (US); Sean P. Rodrigues, Ann Arbor, MI (US); Paul Donald Schmalenberg, Ann Arbor, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 0 days.

(21) Appl. No.: 19/012,655

(22) Filed: Jan. 7, 2025

(65) Prior Publication Data

US 2026/0192749 A1 Jul. 9, 2026

(51) Int. Cl.
*B60R 1/23* (2022.01)

(52) U.S. Cl.
CPC .......... *B60R 1/23* (2022.01); *B60R 2300/202* (2013.01); *B60R 2300/605* (2013.01); *B60R 2300/802* (2013.01)

(58) Field of Classification Search
CPC ................ B60R 1/23; B60R 2300/202; B60R 2300/605; B60R 2300/802
See application file for complete search history.

(56) References Cited

U.S. PATENT DOCUMENTS

| | | | | |
|---|---|---|---|---|
| 6,709,116 | B1 * | 3/2004 | Raskar | G01B 11/25 353/121 |
| 8,089,512 | B2 | 1/2012 | Okabe et al. | |
| 8,339,252 | B2 * | 12/2012 | Ozaki | G08G 1/167 340/438 |
| 9,126,533 | B2 * | 9/2015 | Kubota | H04N 7/183 |
| 10,095,097 | B2 | 10/2018 | Kong et al. | |
| 10,212,342 | B2 * | 2/2019 | Varonos | H04N 23/54 |
| 10,322,673 | B2 * | 6/2019 | Kondo | G02B 27/01 |
| 10,457,211 | B2 * | 10/2019 | Ukeda | B60R 1/25 |
| 10,967,852 | B2 | 4/2021 | Han et al. | |

(Continued)

FOREIGN PATENT DOCUMENTS

| | | |
|---|---|---|
| CN | 105564311 A | 5/2016 |
| CN | 109204144 A | 1/2019 |

(Continued)

*Primary Examiner* — Brian P Yenke
(74) *Attorney, Agent, or Firm* — Snell & Wilmer LLP

(57) ABSTRACT

Methods, systems, and devices for displaying an image of an obstructed blind spot on a pillar of a vehicle. The system includes an internal camera and an external camera. The system also includes a projector configured to beam light in the form of an image onto the pillar, and an electronic control unit (ECU) configured to determine, from the internal camera, the position of a head or an eye of a driver, cause adjustment of the external camera to capture images of an area of a blind spot of the driver, receive, from the external camera, images depicting the area of the blind spot, apply a transformation of the plurality of images to generate a transformed image of the blind spot, and control the projector to emit light in the form of the transformed image towards the pillar to display the transformed image onto the pillar.

20 Claims, 7 Drawing Sheets

(56) References Cited

U.S. PATENT DOCUMENTS

| | | | | |
|---|---|---|---|---|
| 2005/0168695 | A1* | 8/2005 | Ooba | B60R 1/25 180/271 |
| 2007/0081262 | A1* | 4/2007 | Oizumi | B60R 1/25 359/843 |
| 2008/0012938 | A1* | 1/2008 | Kubota | B60Q 9/008 348/118 |
| 2008/0151054 | A1* | 6/2008 | Kubota | B60R 1/25 348/148 |
| 2008/0204557 | A1* | 8/2008 | Kubota | B60R 1/25 348/148 |
| 2008/0239527 | A1* | 10/2008 | Okabe | B60R 1/25 359/843 |
| 2008/0258888 | A1* | 10/2008 | Kubota | B60R 11/02 340/436 |
| 2009/0086019 | A1* | 4/2009 | Okabe | B60R 1/25 348/118 |
| 2009/0201173 | A1* | 8/2009 | Okabe | G08G 1/167 340/905 |
| 2013/0096820 | A1* | 4/2013 | Agnew | B60R 1/23 701/428 |
| 2015/0002642 | A1* | 1/2015 | Dressler | B60R 1/23 348/51 |
| 2017/0210295 | A1 | 7/2017 | Haruyama et al. | |
| 2018/0072156 | A1* | 3/2018 | Tae | B60R 21/213 |
| 2018/0172993 | A1 | 6/2018 | Nill et al. | |
| 2019/0031206 | A1* | 1/2019 | Lang | B60R 1/23 |
| 2019/0210526 | A1* | 7/2019 | Takiguchi | G02B 30/40 |
| 2020/0226975 | A1* | 7/2020 | Jaeger | H04N 7/181 |
| 2020/0384986 | A1* | 12/2020 | Han | B60W 50/14 |
| 2021/0162924 | A1* | 6/2021 | Ohyama | B60R 1/23 |
| 2021/0168339 | A1* | 6/2021 | Ohyama | B60K 35/10 |
| 2021/0331628 | A1* | 10/2021 | Liu | B60K 35/29 |
| 2022/0080890 | A1* | 3/2022 | Johansson | G06F 3/012 |
| 2022/0185182 | A1* | 6/2022 | Jung | B60R 1/00 |
| 2022/0363194 | A1* | 11/2022 | Windeler | H04N 7/181 |
| 2022/0363196 | A1* | 11/2022 | van den Brink | B60R 99/00 |
| 2023/0202395 | A1* | 6/2023 | Ma | G01S 17/931 348/148 |
| 2024/0126095 | A1 | 4/2024 | Shintani et al. | |
| 2024/0190348 | A1* | 6/2024 | Cooprider | B60R 1/23 |
| 2024/0212226 | A1* | 6/2024 | Murakami | G06F 3/14 |
| 2024/0217215 | A1* | 7/2024 | Palmantier | B32B 23/20 |
| 2025/0100461 | A1* | 3/2025 | Kim | B60R 11/0229 |
| 2025/0187541 | A1* | 6/2025 | Ballew | B60R 1/22 |
| 2025/0346183 | A1* | 11/2025 | Cooprider | B60K 35/29 |
| 2026/0138534 | A1* | 5/2026 | Murthy | B60R 1/27 |

FOREIGN PATENT DOCUMENTS

| | | | |
|---|---|---|---|
| CN | 109649279 | A | 4/2019 |
| CN | 112606768 | A | 4/2021 |
| GB | 2417847 | A | 8/2006 |
| JP | 2016049930 | A | 4/2016 |
| JP | 2023138212 | A | 10/2023 |
| KR | 20190133393 | A | 12/2019 |
| WO | 2023224028 | A1 | 11/2023 |

* cited by examiner

REFLECTIVE PILLAR DISPLAY TO VIEW BLIND SPOT OF A VEHICLE PILLAR

BACKGROUND

1. Field

The present disclosure relates to systems and methods for displaying an image of an obstructed blind spot on a pillar (e.g., A-beam or A-pillar) of a vehicle.

2. Description of the Related Art

Various technologies related to addressing blind spots caused by a vehicle's pillars have been adapted. Existing technologies have included large and bulky screens or devices attached to the pillar to display the blind spot, such as organic light-emitting diode (OLED) screens, flat screens, mirrors, or optical elements such as prisms. With these technologies, a box-like casing is needed around the pillar in addition to the screen. This box-like casing is not ideal and may further block the view of the driver. In addition, certain types of screens, such as OLED screens, suffer from degradation by ultraviolet (UV) exposure and can be costly to purchase and replace.

Accordingly, there is a need to better address the blind spot for a driver of a vehicle created by the pillar in a way that does not require unorthodox bulky casings and does not suffer from degradation by UV exposure.

SUMMARY

Described herein is a system for displaying an image of an obstructed blind spot on a pillar connecting a roof to a body of a vehicle. In one aspect, the system includes an internal camera configured to detect a position of a head or an eye of the driver and an external camera configured to detect image data from around the vehicle. The system also includes a projector located on or within the vehicle configured to beam light in the form of an image onto the pillar, and an electronic control unit (ECU) configured to (1) determine, from the internal camera, the position of the head or the eye of the driver of the vehicle, (2) cause, based on the position of the head or the eye of the driver, adjustment of the external camera to capture a plurality of images of an area or a space of a blind spot of the driver, (3) receive, from the external camera, a plurality of images depicting the area or the space of the blind spot of the driver, (4) apply a transformation of the plurality of images based on a known geometry of the pillar to generate a transformed image of the blind spot, and (5) control the projector to emit light in the form of the transformed image towards the pillar to display the transformed image, wherein when viewing the pillar, the image behind the blind spot is shown on the pillar.

In one aspect, the subject matter may be embodied in a method for displaying an image of a line of sight of a driver on a beam or a pillar (e.g., an A-beam or an A-pillar) of a vehicle. The method may include determining, based on image data from inside the vehicle detected by an internal camera, a position of a head or an eye of the driver of the vehicle. The method may include adjusting, based on the position of the head or the eye of the driver, a position of an external camera to capture a plurality of images of the line of sight of the driver. The external camera may be configured to detect image data from outside the vehicle. The method may further include receiving, from the external camera, a plurality of images depicting the line of sight. The method may further include applying a transformation of the plurality of images based on a known geometry of the A-beam to generate a transformed image of the line of sight. The method may further include displaying the transformed image using a projector located on or within the vehicle. The method may further include emitting light from the projector towards a reflective surface on the A-beam to display the transformed image on the reflective surface such that, when viewing the A-beam, an image depicting the line of sight behind the A-beam is shown on the reflective surface.

In one aspect, the subject matter may be embodied in a vehicle including a system for displaying an image of an obstructed blind spot on an A-beam of the vehicle. The vehicle may include an internal camera configured to detect a position of a head or an eye of a driver and an external camera configured to detect image data from around or outside the vehicle. The vehicle may further include an A-beam connecting a roof of the vehicle to a body of the vehicle. The A-beam may be coated with a reflective surface. The vehicle may further include a projector located on or within the vehicle and configured to beam light in the form of an image onto the reflective surface of the A-beam. The vehicle may further include an ECU configured to (1) determine, from the internal camera, the position of the head or the eye of a driver of the vehicle, (2) cause, based on the position of the head or the eye of the driver, adjustment of the external camera to capture a plurality of images of an area or a space of a blind spot of the driver, (3) receive, from the external camera, a plurality of images depicting the area or the space of the blind spot of the driver, (4) apply a transformation of the plurality of images based on a known geometry of the A-beam to generate a transformed image of the blind spot, and (5) control the projector to emit light towards the reflective surface of the A-beam to display the transformed image on the reflective surface. When viewing the A-beam, the image behind the blind spot is shown on the reflective surface of the A-beam.

BRIEF DESCRIPTION OF THE DRAWINGS

Other systems, methods, features, and advantages of the present disclosure will be apparent to one skilled in the art upon examination of the following figures and detailed description. Component parts shown in the drawings are not necessarily to scale and may be exaggerated to better illustrate the important features of the present disclosure. In the drawings, like reference numerals designate like parts throughout the different views.

DETAILED DESCRIPTION

Figure 1:
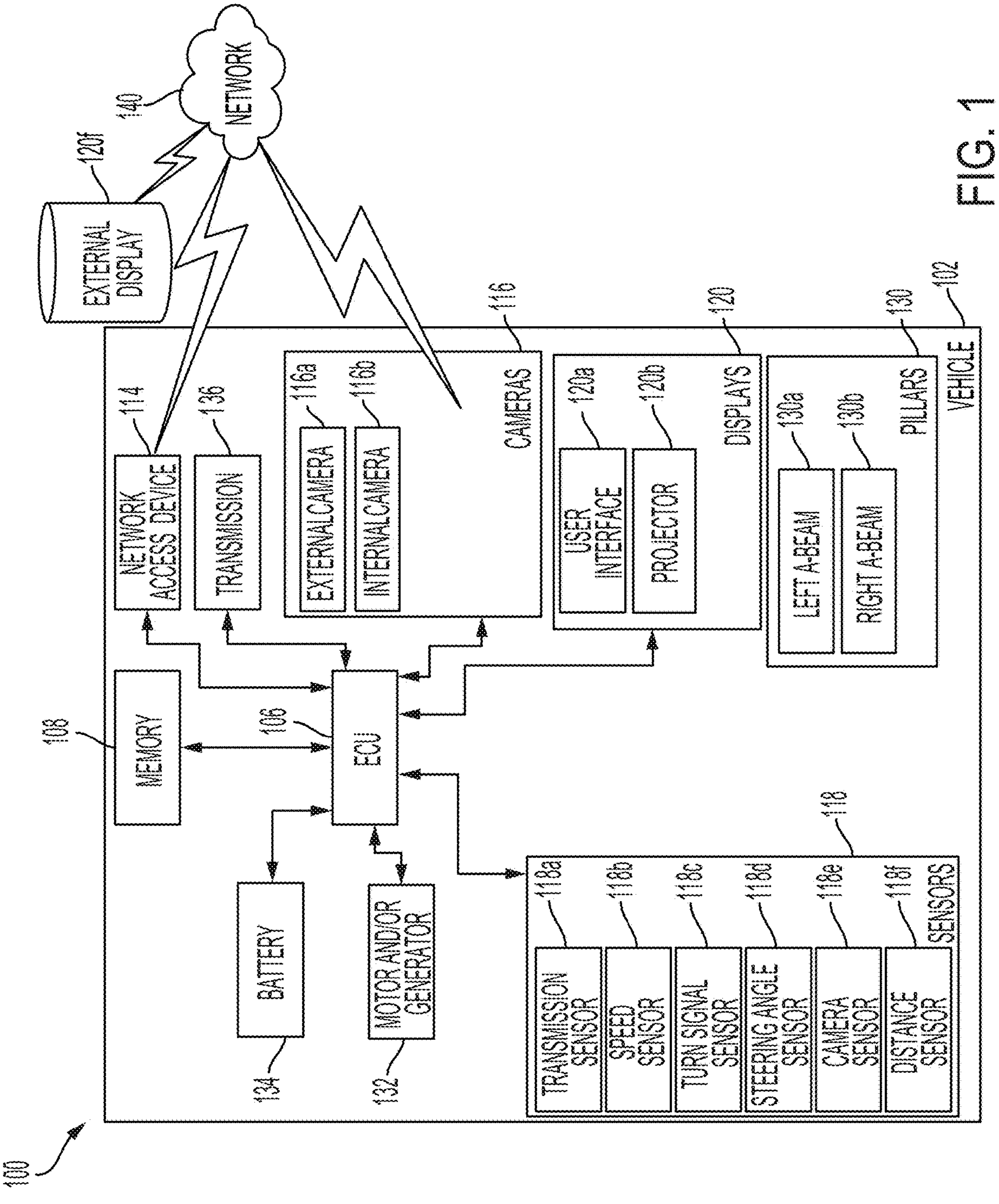
FIG. 1 is a block diagram illustrating a vehicle having a system for displaying an image of an obstructed blind spot on a pillar of a vehicle according to an aspect of the disclosure.

Disclosed herein are methods, systems, and/or devices for projecting an image of an obstructed blind spot on a pillar (e.g., an A-pillar) of a vehicle such that, when viewing the pillar, an image of the area or the space behind the blind spot is shown on the pillar. The systems and methods described herein may include one or more internal cameras to determine the position of the head or the eye of the driver to determine the driver's line of sight and accordingly, where the pillar may create a blind spot for the driver. Based on the determined line of sight of the driver, one or more external cameras may therefore be adjusted to capture images of the area or the space of the blind spot for the driver.

The systems, methods, and/or devices described herein may also include a computer or an electronic control unit (ECU) that can transform the images captured by the one or more external cameras of the blind spot and display or transmit the transformed image to the projector. The projector can emit light in the form of the transformed image towards the pillar such that the driver can then see the items reflected off the surface of the pillar that would otherwise be obstructed to the driver. The pillar may be coated with a reflective material in order to reflect the projected image to display the otherwise obstructed view to the driver. Accordingly, aspects of the present disclosure make the pillar less obstructive to the driver.

Particular aspects of the subject matter described herein may be implemented to realize one or more of the following advantages. These systems and methods provide many benefits and advantages such as improving safety of driving a vehicle by allowing a driver to see an image of an area or a space behind a blind spot created by a pillar or A-beam on the pillar or the A-beam. A vehicle pillar (e.g., an A-pillar, B-pillar or C-pillar) is often made of alloys or strong metals, which are not transparent and are generally robust. A robust, nontransparent pillar creates a blind spot for a driver of the vehicle. Because of the material used to make pillars, it is difficult to create a strong pillar for the vehicle that can be transparent. The transparency allows a driver to see through the pillar without a blind spot. The systems and methods described herein allow the driver to view an area or a space that would otherwise be blocked by the pillar or A-beam and therefore, improve safety by eliminating a blind spot for the driver.

The systems and methods herein also provide the benefits and advantages of providing a durable, UV-resistant, and affordable method of displaying the blind spot behind a pillar. Existing methods of displaying a blind spot on a pillar may involve attaching a screen to the pillar. These screens often suffer from UV degradation and when attaching a screen to a pillar, these existing methods typically use a casing around the pillar. Unlike existing methods involving a screen attached to the pillar, the present disclosure provides systems, methods, and devices of displaying the driver's blind spot on the pillar without using an unorthodox casing on the pillar. Instead, a projector can display an image of the area or the space behind the pillar. In examples, the projector may be a bright screen, a flexible screen, a bendable screen and/or other display screen. Furthermore, the projector can be a liquid crystal display (LCD) screen. LCD screens are resistant to degradation from UV light. As such, the projector may not be replaced as frequently as other types of screens traditionally used, such as an OLED screen, which suffer from UV degradation at a faster rate than an LCD screen. Therefore, the present disclosure provides a method of displaying the blind spot using a more affordable standard screen technology that is also UV resistant.

An exemplary system for displaying an image of an obstructed blind spot on a pillar of a vehicle is disclosed herein. The pillar (or beam) may be an A-pillar, B-pillar or C-pillar, which connects a roof of the vehicle to a body of the vehicle. The system includes an internal camera configured to detect a position of a head or an eye of the driver and an external camera configured to detect image data from around or outside the vehicle. The system also includes a projector located on or within the vehicle and configured to beam light in the form of an image onto the pillar. For illustrative purposes, the beam or the pillar can have an inside surface and an outside surface. The projector can be located on a front right side of the dashboard with the light being emitted upwards toward the inside surface of the pillar. The system may also include an electronic control unit (ECU) configured to (1) determine, from the internal camera, the position of the head or the eye of the driver of the vehicle, (2) cause, based on the position of the head or the eye of the driver, adjustment of the external camera to capture a plurality of images of an area or a space of a blind spot of the driver, (3) receive, from the external camera, a plurality of images depicting the area of the blind spot of the driver, (4) apply a transformation of the plurality of images based on a known geometry of the pillar to generate a transformed image of the blind spot, and (5) control the projector to emit light in the form of the transformed image towards the inside surface of the pillar to display the transformed image, wherein when viewing the pillar, the image behind the blind spot is shown on the inside surface of the pillar. The external camera may be located or positioned on the outside surface of the pillar. As an example, the one or more external cameras can be located or positioned on the outside surface of the pillar at or around eye level relative to the driver's eye sight in a seated position in the driver's seat to allow for a more accurate view of the area outside the vehicle (i.e., the driver's blind spot).

Turning to FIG. 1, a blind spot projection system 100 is illustrated. The blind spot projection system 100 or a portion thereof may be retrofitted, coupled to, include, or be included within a vehicle 102 or separate from the vehicle 102. The vehicle 102 may be a conveyance capable of transporting a person, an object, or a permanently or temporarily affixed apparatus. The vehicle 102 may be a self-propelled wheeled conveyance, such as a car, a sports utility vehicle, a truck, a bus, a van or other motor, battery or fuel cell driven vehicle. For example, the vehicle 102 may be an electric vehicle, a hybrid vehicle, a hydrogen fuel cell vehicle, a plug-in hybrid vehicle or any other type of vehicle that has a fuel cell stack, a motor, an engine, and/or a generator. Other examples of vehicles include bicycles, trains, planes, or boats, and any other form of conveyance that is capable of transportation. The vehicle 102 may be semi-autonomous or autonomous. That is, the vehicle 102 may be self-maneuvering and navigate without human input.

An autonomous vehicle may have and use one or more sensors and/or a navigation unit to drive autonomously.

The blind spot projection system 100 may include one or more processors, such as an electronic control unit (ECU) 106. The ECU 106 may be implemented as a single ECU or as multiple ECUs. The ECU 106 may be electrically connected to some or all of the components of the vehicle 102 and/or the blind spot projection system 100 (e.g., via a network 140, such as a controller area network (CAN) bus and/or other protocols). The ECU 106 may be electrically connected to one or more cameras 116, one or more sensors 118, one or more displays 120, a memory 108, and/or a network access device 114. The ECU 106 may include one or more processors (or controllers) specifically designed for controlling operations of the vehicle 102, such as accelerating, braking, controlling a panoramic view monitor (PVM) of the vehicle 102 (e.g., the one or more cameras 116), etc. In examples, the ECU 106 may be and/or include an advanced driver assistance systems (ADAS) sensor fusion ECU, a panoramic view monitor (PVM) ECU, an engine control module (ECM), a transmission control module (TCM), a telematics control unit (TCU), an in-vehicle infotainment (IVI) ECU, and/or a graphics processing unit (GPU).

As mentioned above, the vehicle 102 may include one or more cameras 116. The one or more cameras 116 may include an external camera **116*a* and/or an internal camera 116*b*. As an example, the external camera 116*a* may be positioned on the outside surface of the A-pillar and the internal camera 116*b*** may be positioned on or near the dashboard, the center console, the head unit, the speedometer, the driver's sun visor.

The one or more cameras 116 may be a digital camera, an infrared thermal camera, and/or a night vision camera (e.g., utilizing active illumination and/or image intensification). In examples, the one or more cameras 116 may be and/or include a panoramic view monitor (PVM) system of the vehicle 102. The one or more cameras 116 may provide, capture, and/or record real-time video (or video data) including images and/or video of a surrounding area of the vehicle 102 and/or inside the vehicle 102. Each camera of the one or more cameras 116 may capture one or more fields of view that may include at least a portion of the surrounding area, inside the vehicle 102, and/or outside the vehicle 102. In examples, each camera of the one or more cameras 116 may allow the user to change a zoom level of each camera (e.g., via a user interface **120*a*) and/or the vehicle 102 may automatically change the zoom level of each camera based on a speed of the vehicle 102 (e.g., the zoom level decreases as the speed of the vehicle 102** increases).

The external camera **116*a* may include one or more cameras that are positioned on the outside surface of the pillars 130, (e.g., a left A-beam 130*a* and/or a right A-beam 130*b*), and/or a side of the vehicle (e.g., a side quarter panel, a side door, etc.). In examples, the vehicle 102 may include a plurality of external cameras each having a different field of view and/or orientation. The external camera 116*a* may provide, capture, and/or record real-time video of a field of view (or direction) with respect to the vehicle 102 (e.g., capturing a portion of the surrounding area that is to the left front and/or right front of the vehicle 102** and/or capturing a portion of the left side and/or right side of the vehicle).

The internal camera **116*b* may be positioned on the interior of the vehicle, such as the interior of the left A-beam 130*a* and/or right A-beam 130*b*, and/or dashboard of the vehicle 102. In examples, the vehicle 102 may include a plurality of internal cameras each having a different field of view and/or orientation. The internal camera 116*b* may provide, capture, and/or record real-time video of an interior field of view (or direction) with respect to the vehicle 102 (e.g., capturing a portion of the area that is inside of the vehicle 102** including the passengers inside the vehicle).

In examples, the internal camera **116*b* may be used to capture images of a person inside the vehicle 102. The images of the person captured by the internal camera 116*b* may then be displayed in real-time on the pillars 130 (e.g., a left A-beam 130*a* and/or a right A-beam 130*b*) in a real-time video feed. The image of the person captured by the internal camera 116 may be transformed (e.g., through a transformation equation to result in an appropriately reflected image on the pillar) before being displayed on the pillars 130. Displaying a real-time video feed of a person inside the vehicle 102** may be used for social interaction among passengers of the vehicle.

The vehicle 102 may further include one or more sensors (or one or more vehicle sensors) 118. The one or more sensors 118 may include an ECU for each respective sensor, where each ECU may be part of an ECU network. The one or more sensors 118 may be integrated with the vehicle. The one or more sensors 118 may measure, detect (or indicate), and/or determine one or more conditions (or one or more vehicle conditions) of the vehicle 102 periodically and/or continuously. The one or more conditions of the vehicle 102 may include a shift position, a vehicle speed, a turn signal status, a steering angle, a camera condition, and/or a proximity to one or more objects. The one or more sensors 118 may be and/or include software, hardware, firmware, or a combination thereof for measuring, detecting, and/or determining the one or more conditions of the vehicle 102. The one or more sensors 118 may include a transmission sensor (or shift sensor) **118*a*, a speed sensor 118*b*, a turn signal sensor 118*c*, a steering angle sensor 118*d*, a camera sensor 118*e*, and/or one or more distance sensors 118*f*. In examples, the vehicle 102 may include two or more, three or more, four or more, or all of the transmission sensor 118*a*, the speed sensor 118*b*, the turn signal sensor 118*c*, the steering angle sensor 118*d*, the camera sensor 118*e*, and/or the one or more distance sensors 118*f***.

The transmission sensor **118*a* may be located within the vehicle 102 and/or coupled to the transmission 136 of the vehicle 102. The transmission sensor 118*a* may indicate, detect, and/or determine the shift position (or gear position or mode) of the vehicle 102 and/or the transmission 136. The shift position may include drive, reverse, and/or neutral. In examples, the vehicle 102** may include a plurality of transmission sensors.

The speed sensor **118*b* may be located within the vehicle 102. The speed sensor 118*b* may measure, detect, and/or determine the vehicle speed of the vehicle 102. In examples, the speed sensor 118*b* may measure, detect, and/or determine the vehicle speed based on a rotation speed of an output shaft of the transmission 136, a rotation speed of the one or more wheels of the vehicle 102, and/or a global positioning system (GPS) signal. In examples, the vehicle 102** may include a plurality of speed sensors.

The turn signal sensor **118*c* may be located within the vehicle 102 and/or coupled to an indicator stalk and/or a steering wheel of the vehicle 102. The turn signal sensor 118*c* may indicate, detect, and/or determine the turn signal status of the vehicle 102. The turn signal status may include whether a left turn signal of the vehicle 102 is activated and/or whether a right turn signal of the vehicle 102 is activated. For example, the turn signal sensor 118*c* may detect when a driver of the vehicle 102 activates the left turn signal or the right turn signal of the vehicle 102. In examples, the turn signal sensor 118***c* may detect when the vehicle 102 activates the left turn signal or the right turn signal during, for example, autonomous driving or semiautonomous driving. In examples, the vehicle 102 may include a plurality of turn signal sensors.

The steering angle sensor 118*d* may be located within the vehicle 102 and/or coupled to the steering wheel or of the vehicle 102. The steering angle sensor 118*d* may measure, detect, and/or determine the steering angle of the vehicle 102 (e.g., a degree of rotation of the steering wheel in a left or right direction from a center (or reference) position). In examples, the vehicle 102 may include a plurality of steering angle sensors. The steering angle sensor 118*d* may indicate whether the vehicle 102 is making a turn (e.g., when the vehicle 102 turns 20 degrees or more left or right) or a minor change in direction (e.g., when the vehicle 102 turns between 0 and 20 degrees left or right).

The camera sensor 118*e* may be located within the vehicle 102. The camera sensor 118*e* may indicate, detect, and/or determine the camera condition of the vehicle 102. For example, the camera condition may include whether the external camera 116*a* and/or internal camera 116*b* is activated.

The one or more distance sensors 118*f* may be coupled to the exterior of the vehicle 102. The one or more distance sensors 118*f* may be and/or include a camera, a sonar sensor, a radar sensor, and/or a lidar sensor. The one or more distance sensors 118*f* may measure, detect, and/or determine the proximity of one or more objects in the surrounding area of the vehicle 102. The one or more distance sensors 118*f* may measure, detect, and/or determine the proximity of the one or more objects by collecting spatial information of the one or more objects and constructing a point cloud. In examples, the vehicle 102 may include a plurality of distance sensors.

The blind spot projection system 100 may further include one or more displays 120. The one or more displays 120 may include a user interface (or infotainment display) 120*a* and/or a projector 120*b*. The one or more displays 120 may be native to the vehicle 102 and/or may be retrofitted to the vehicle 102. The one or more displays 120 may include a liquid crystal display (LCD), a light-emitting diode (LED) display, a segment display, a holographic display, an e-paper display, a laser color video display, and/or other display types. In examples, the one or more displays 120 may include an external display 120*f* (e.g., a mobile phone, a laptop, a tablet, etc.) that may have some or all of the functions (e.g., receiving and displaying images) as the user interface 120*a*. The projector 120*b* may emit light in the form of a transformed image of the driver's blind spot onto one or more pillars 130 (which is discussed in greater detail below).

The user interface 120*a* may be located within the cabin of the vehicle 102 and/or may be coupled to a dashboard of the vehicle 102. The user interface 120*a* may provide an interface to the user of the vehicle 102 to interact with and/or receive output from the ECU 106. The user interface 120*a* may have a user interface element, such as one or more screens and/or one or more touchscreens with a button, a switch, a microphone, a speaker, a gesture monitoring sensor, a knob, a graphical user interface (GUI), and/or other input/output devices electrically connected to the ECU 106 to provide input and/or output of information (or data) to and/or from the ECU 106.

Figure 8:
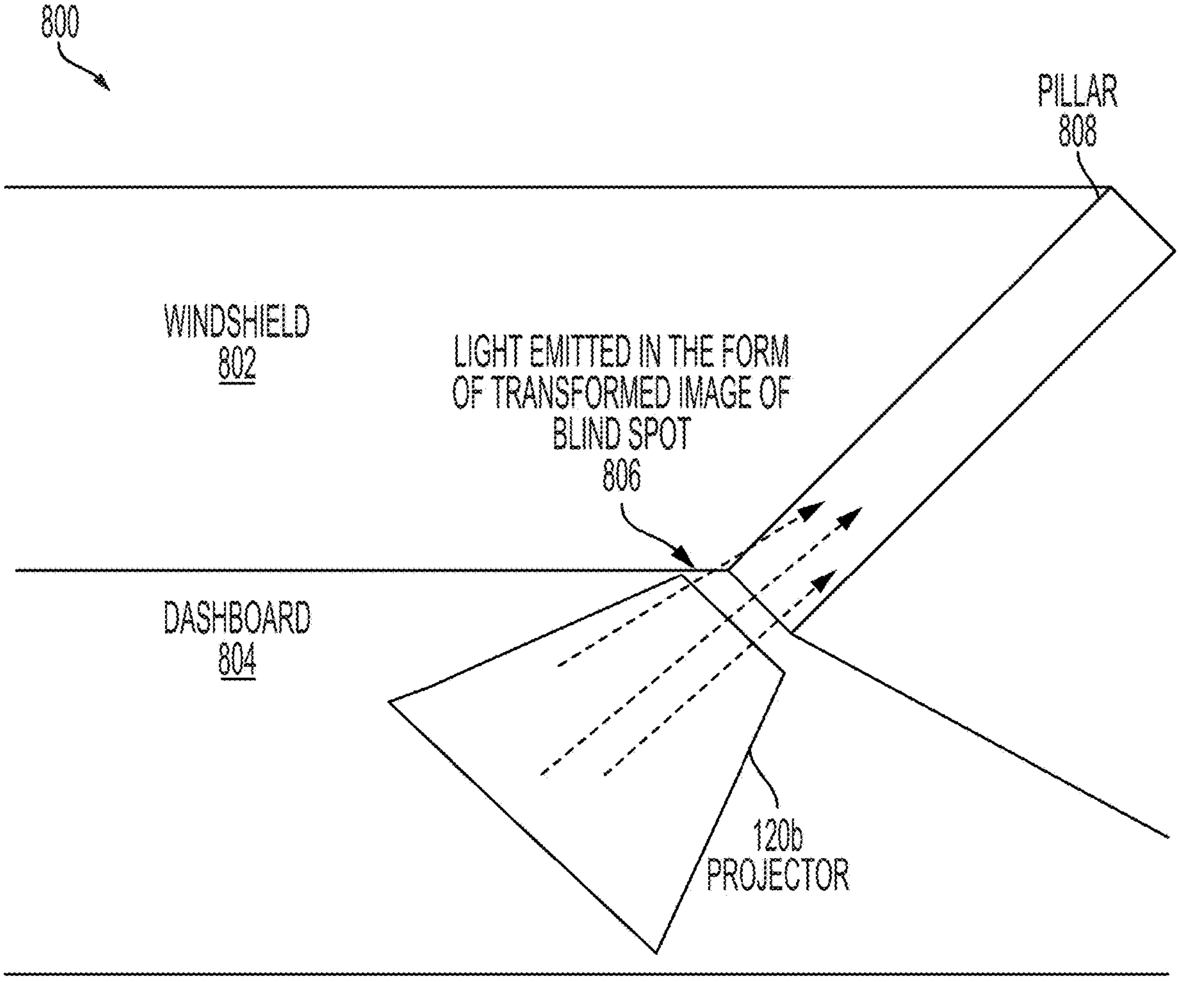
FIG. 8 is an illustration of an example blind spot projection system according to an aspect of the disclosure.

The projector 120*b* may be located within the cabin of the vehicle 102 and/or may be positioned on the dashboard of the vehicle 102 (as shown by FIG. 8). The projector 120*b* may have one or more screens and/or physical indicators to display a transformed image of the driver's blind spot. In some aspects, the projector 120*b* may be an LCD display, MicroLED, or other non-OLED display. The projector 120*b* may be coupled to the ECU 106. In examples, the projector 120*b* may emit light in the form of the transformed image, received via the ECU 106, in the direction of one or more of the pillars 130.

The ECU 106 may receive real-time video data from the one or more cameras 116 including the external camera 116*a* and/or the internal camera 116*b*. The ECU 106 may determine, via the internal camera 116*b*, a position of the head of the driver. The ECU 106 may control and/or activate the external camera 116*a* to capture real-time video data including the surrounding view of the vehicle based on the determined position of the head of the driver of the vehicle 102. Based on the position of the head of the driver, the ECU 106 may cause the external camera 116*a* to adjust its position to capture a plurality of images of an area of a blind spot of the driver. The external camera 116*a* may not need to be moved or adjusted when the external camera 116*a* has a wide field of view. The ECU 106 may receive, from the external camera 116*a*, a plurality of images depicting the area of the blind spot of the driver.

Based on the received images from the external camera 116*a*, the ECU 106 may apply a transformation of the received images based on a known geometry of the pillar to generate a transformed image of the blind spot. The ECU 106 may optionally crop the received images (e.g., via intelligent cropping) where the field of view of the camera 116*a* is wider than the image displayed on the pillar 130. In some aspects, the image displayed on the pillar 130 is only the image(s) that can fit on the pillar 130 without displaying anything on the adjacent windows to prevent reflections or distractions to the driver's view. The ECU 106 may control the projector 120*b* to display the transformed image and emit light in the form of the transformed image towards the pillar 130 to display the transformed image. In this way, when viewing the pillar 130, the image behind the blind spot is shown on the pillar 130 (which is discussed in greater detail below with reference to FIGS. 4-6 and FIG. 8).

The vehicle 102 may include a motor and/or generator 132, a battery 134, and/or a transmission 136. The motor and/or generator 132 may be located within an engine bay of the vehicle 102. The motor and/or generator 132 may be an internal combustion engine (ICE). In this regard, the motor and/or generator 132 may combust an air and fuel mixture to provide power to the vehicle 102 and/or components of the vehicle 102. Accordingly, the motor and/or generator 132 can cause the vehicle 102 to accelerate, decelerate, or maintain a desired velocity. It should be understood that the motor and/or generator 132 may include combinations of an ICE and an electric motor, such as for hybrid vehicle applications for example. In examples, the motor and/or generator 132 may be an electric motor. In this regard, the motor and/or generator 132 may be an electric motor and an electric generator that converts electrical energy into mechanical power, such as torque, and converts mechanical power into electrical energy. The motor and/or generator 132 may be electrically connected to the battery 134. The motor and/or generator 132 may convert energy from the battery 134 into mechanical power, and may provide energy back to the battery 134, for example, via regenerative braking. The battery 134 may be electrically connected to the motor and/or generator 132 and may provide electrical energy to and/or receive electrical energy from the motor and/or generator 132. The battery 134 may provide electrical energy to the vehicle 102.

The transmission 136 may be an automatic transmission (e.g., a 6-speed, 7-speed, 8-speed, 9-speed, or 10-speed automatic transmission) or a manual transmission (e.g., a six-speed manual transmission) having at least one reverse gear, a neutral position, and at least one forward (or drive) gear. In examples, the transmission 136 may be an electric vehicle transmission (e.g., a single speed or two speed transmission). The transmission 136 may receive torque from the motor and/or generator 132 and may transfer the torque to one or more wheels of the vehicle 102.

Figure 2:
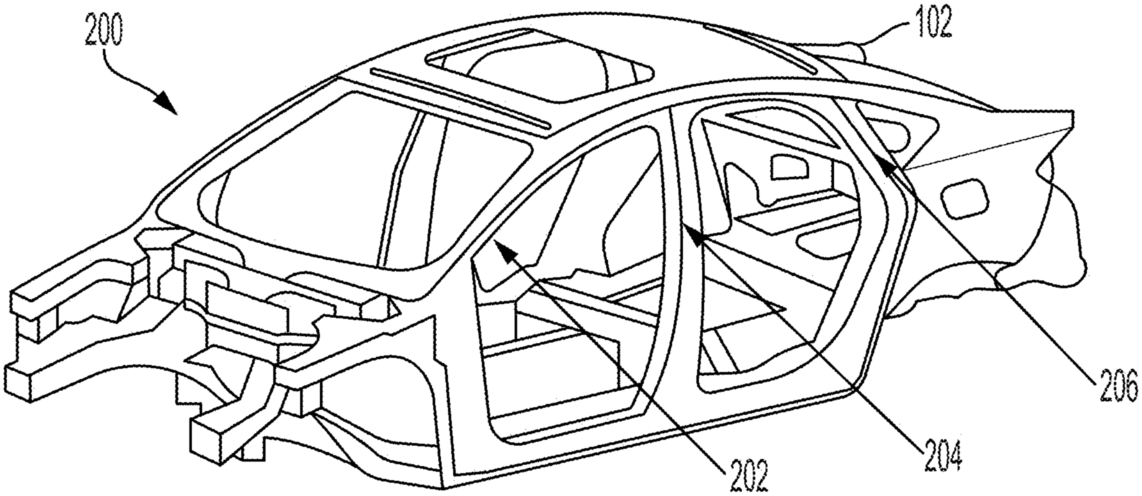
FIG. 2 is a schematic view of an example vehicle including various beams or pillars according to an aspect of the disclosure.

FIG. 2 is an illustration 200 of an example vehicle 102 that may incorporate the example blind spot projection system 100 of FIG. 1. The vehicle 102 may include one or more A-beams 202, one or more B-beams 204, and one or more C-beams 206. These three types of beams may also be referred to herein as "pillars." As shown by FIG. 2, pillar materials are often made of strong, hard materials, such as alloys. These alloys are not transparent and are robust. For example, the pillars may be made with a steel alloy.

The one or more A-beams 202 may be structural support posts that are located on either side of a vehicle's windshield that connects the roof of the vehicle 102 to the body of the vehicle 102. The one or more B-beams 204 may be structural support posts that are located between the front and rear side glass of the vehicle 102 which provide support to the roof of the vehicle 102. The one or more C-beams 206 may be structural support posts that provide support to the rear of the vehicle 102. These various types of pillars may cause blinds spots for a driver due to their nontransparent material that may block a portion of the view of a driver of the vehicle 102.

Figure 3A:
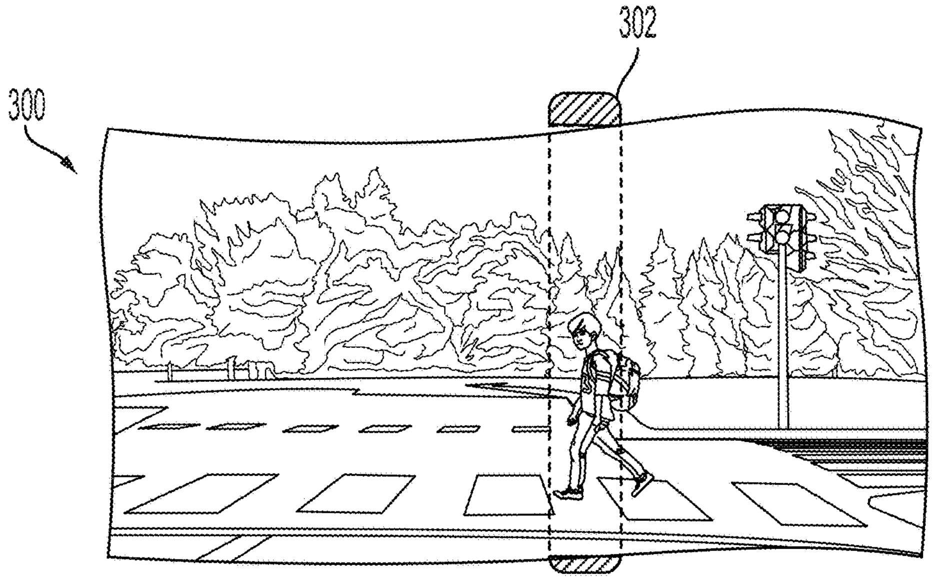
FIGS. 3A-3C are illustrations of example views that may be obstructed by an A-beam of a vehicle according to an aspect of the disclosure.
Figure 3B:
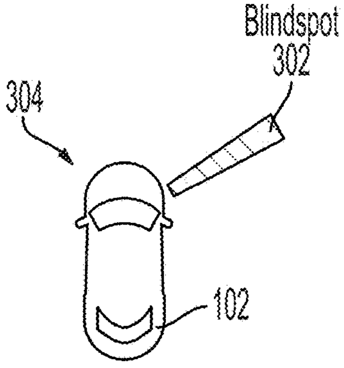
Figure 3C:
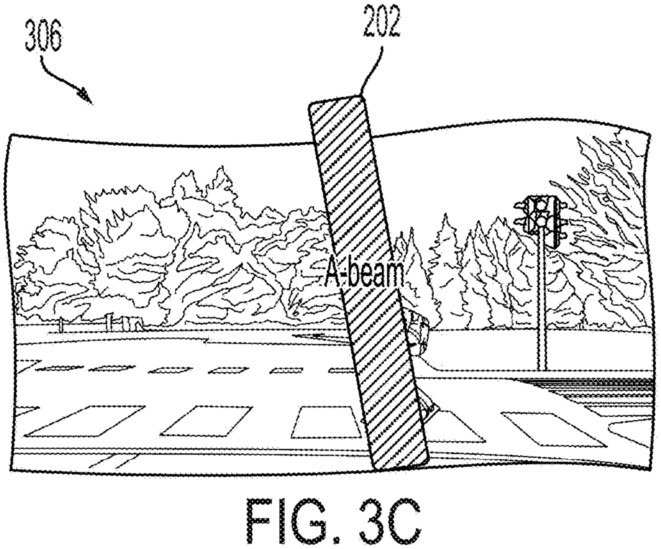

FIGS. 3A-3C depict illustrations of example views that may be obstructed by an A-beam 202 of a vehicle 102 according to an aspect of the disclosure. FIG. 3A depicts an illustration 300 of a person walking at a cross walk which may be seen from the perspective of the driver of the vehicle 102. The illustration 300 shows how, based on the positioning of the vehicle's pillars, there may be a blind spot 302 in the driver's field of view. As shown in the illustration 300, the blind spot 302 may block the driver's view of a person in the crosswalk. Therefore, due to the position of the pillar, the driver may not be able to see the person in the crosswalk.

FIG. 3B depicts an illustration 304 of the vehicle 102 from a top-down view and a potential blind spot 302 for a driver of the vehicle 102 that may be caused by a pillar of the vehicle 102. In this figure, the blind spot 302 is created by the right a-beam of the vehicle 102. In addition, the blind spot 302 of FIG. 3B depicts how, from the top-down view, that blind spot area may be increased as it moves farther away from the vehicle 102. Therefore, the farther away something is from the vehicle 102, the larger the area of obstruction is from the pillar. The blind spot 302 can impact the driver more at larger distances as it obscures more depth. For example, more of an object farther away from the vehicle 102 may be blocked by a vehicle's pillar than an object closer to the vehicle 102.

FIG. 3C depicts an illustration 306 of the driver's field of view as shown in FIG. 3A with the a-beam 202 obstructing the driver's field of view. The obstruction from the A-beam 202 therefore creates the blind spot 302. As depicted in FIG. 3C, the A-beam 202 obstructs the driver's view of the scene and therefore, from the driver's point of view, the driver cannot see the person walking in the cross walk due to the location of the A-beam 202.

Figure 4:
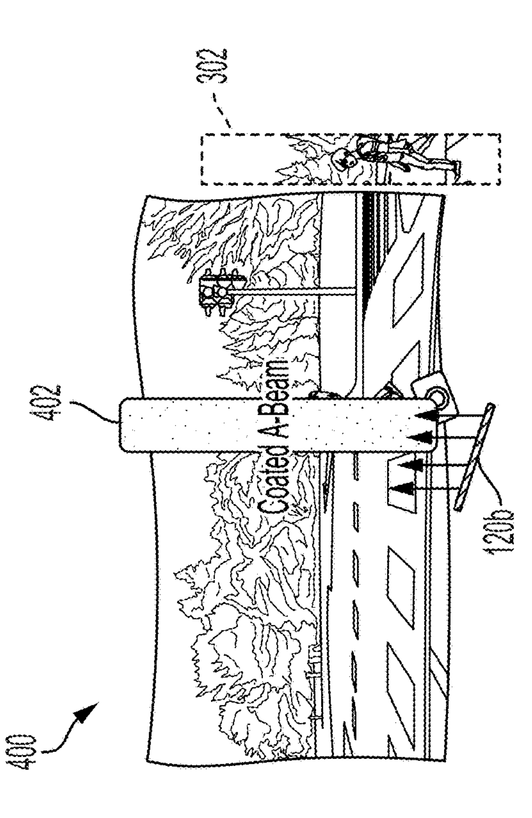
FIG. 4 is an illustration of the view of FIGS. 3A and 3C incorporating a coated A-beam to display an obstructed view according to an aspect of the disclosure.

FIG. 4 is an illustration 400 of the view of FIG. 3A depicting a portion of a driver's view that incorporates a coated A-beam 402 of a vehicle 102. The coated A-beam 402 may be a pillar in the vehicle 102 that is coated with a reflective surface. For example, the coated A-beam 402 may be one of the pillars 130 as shown and described in FIG. 1. The coating on the pillar may include a material that allows a projected image to be reflected back such that the driver, when viewing the pillar, can see the image on the pillar. As shown in FIG. 4, the coated A-beam 402 may create a blind spot which may cover the area behind the blind spot 302 by obstructing the driver's field of view. In the example of FIG. 4, the A-beam 402 covers a person using a cross walk in the driver's field of view 306. However, to mitigate this issue, the coated A-beam 402 may be used to display an image of the area behind the blind spot 302. More specifically, the coated A-beam 402 may be positioned next to a projector 120*b*. The projector 120*b* may emit light in the form of a transformed image of the area behind the blind spot 302. The coated A-beam 402 can reflect, with its reflective coating, the image shown in the projector 120*b*. The projector 120*b* may be positioned horizontally (e.g., on the dashboard) and emit the light of the transformed image in its display vertically (e.g., towards the pillar). However, this is not meant to be limiting or required, as other orientations of the projector 120*b* and the emitted light may also be possible. In this way, the coated A-beam 402 may display an image of the person crossing in the cross walk as shown in the area behind the blind spot 302 by reflecting in the reflective coating the transformed image from the projector 120*b*.

Figure 5:
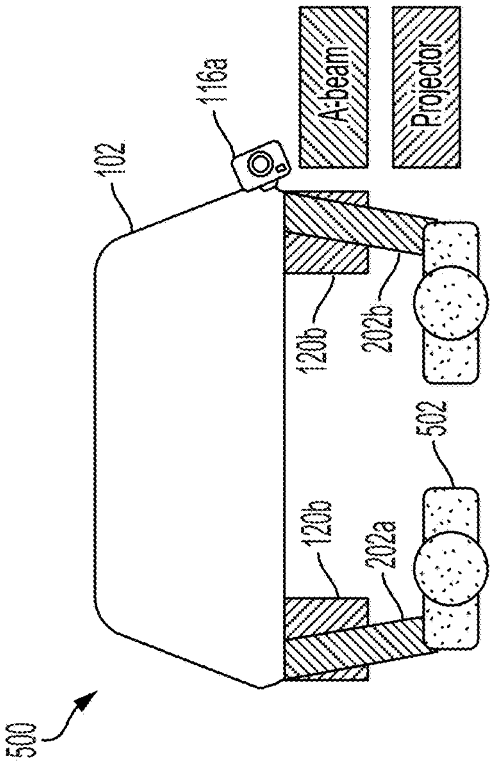
FIG. 5 is a schematic view of an example front of a vehicle including a projector for projecting an image of a blind spot onto a pillar according to an aspect of the disclosure.

FIG. 5 depicts an example birds eye view 500 of the front of a vehicle 102 implementing the blind spot projection system 100. The front of the vehicle 102 may include a left A-beam 202*a* and a right A-beam 202*b*. In examples, the left A-beam 202*a* and the right A-beam 202*b* may be pillars 130 as shown and described in FIG. 1. The left A-beam 202*a* and the right A-beam 202*b* may be located adjacent to a windshield of the vehicle 102. The front of the vehicle 102 may further include a projector(s) 120*b* and an external camera 116*a*. The projector 120 *b* may be positioned adjacent to the left A-beam 202*a* and/or the right A-beam 202*b*. Likewise, the external camera 116 *a* may be positioned on the outside of the left A-beam 202*a* and/or the right A-beam 202*b* such that the external camera 116 *a* may capture an area surrounding the blind spot created by the A-beams. The vehicle 102 may also include one or more internal cameras (not shown), such as the internal camera 116*b* as shown and described in FIG. 1.

In the front of the vehicle 102 there may be a driver 502, as well as other passengers. Internal cabin cameras placed in the vehicle can sense the position of the head of a driver 502. In examples, these internal cameras may use eye tracking in order to better determine the position of the head of the driver and/or to determine the driver's line of sight. In some aspects, infrared light sources in the form of flood projection in the cabin of the vehicle 102 can also be used to determine the position of the head of the driver 502 in dark situations and the like. The images detected by the internal cameras may be passed to a controller (e.g., ECU 106 of FIG. 1) that can determine, based on the detected position of the head of the driver 502, where the field of view for the driver 502 and, correspondingly, the blind spot of a driver, may be located.

The external camera 116*a* may be adjusted based on the determined position of the driver 502 in order to properly capture images of the blind spot in this particular driver's line of sight. For example, the external camera 116*a* may be rotated and/or moved towards the direction of the driver's blind spot. The images captured by the external camera 116*a* may be transformed and sent (e.g., via the ECU 106) for display to the projector 120*b*. The projector 120*b* can display an image of the area behind the blind spot as captured by the external camera 116*a*. The projector 120*b* can then emit light in the form of the transformed image towards the A-beam 202*a* and/or 202*b*, which can display the image of the area behind the blind spot. In some aspects, as described in further detail with respect to FIG. 7, the image of the blind spot may show different perspectives for passengers of the vehicle other than the driver.

Figure 6:
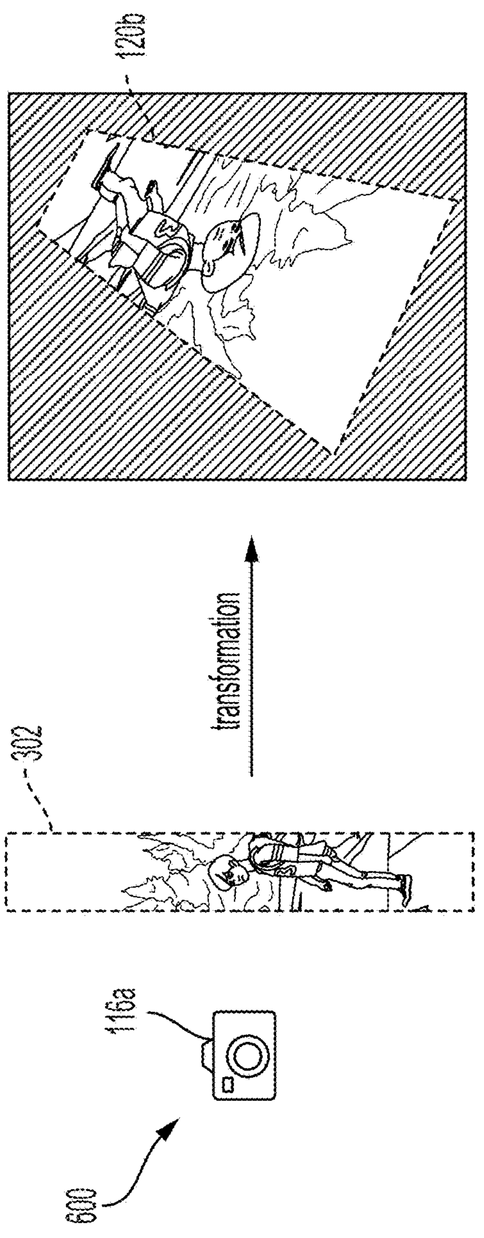
FIG. 6 is an example illustration of transforming an image of a blind spot and displaying the transformed image using a projector according to an aspect of the disclosure.

FIG. 6 is a block diagram 600 depicting the transformation of images received from an external camera 116*a* depicting an area behind a blind spot 302 into a modified image for display on the projector 120*b*. First, the external camera 116*a* may capture images of the external portion of the vehicle 102. The external camera 116*a* may be directed or focused in the general direction of the blind spot of the driver, as shown and described in the preview figures. For example, the external camera 116*a* may be placed on the outside of the A-beam of the vehicle 102. The projector 120*b* may show a purposefully distorted image of the area behind the blind spot 302. The distorted image may be generated by transforming the images captured by the external camera 116*a* that are relevant to the blind spot perceived by the driver 502. The transformation (e.g., distortion) of the image may be dependent on several factors. These factors may include the information from the controller (e.g., ECU), the shape of the pillar, and/or the orientation of the projector relative to the pillar. Existing computational strategies may be leveraged to determine such image transformations. In addition, as the shape of the pillar may be approximately cylindrical, and the image from the display may be rectangular, the distorted image may be transformed into the original perspective from the external camera 116*a* to accommodate the difference in shape.

As described above, the projector 120*b* can emit light in the form of the transformed image towards the pillar. The light is reflected off the pillar so that the driver can then see an image of the view beyond the pillar that would have otherwise been obstructed to the driver. In some aspects, the blind spot projection system 100 can display augmented reality information on the image simultaneously with the transformed image. In some aspects, the system 100 can display and/or project other custom patterns or images from the projector 120*b* to create a custom lighting or decorative pattern features on the pillar. For example, the system 100 can display a pattern to match the pillar when the pillar is not functioning as a blind spot removal device. The projector and reflective pillar system may have the option (e.g., a switch) to turn on and off digitally depending on whether the observer wants to use it. For example, a passenger or driver of the vehicle may not wish to use the blind spot projection feature and may therefore have the option to turn off the feature when desired.

Figure 7:
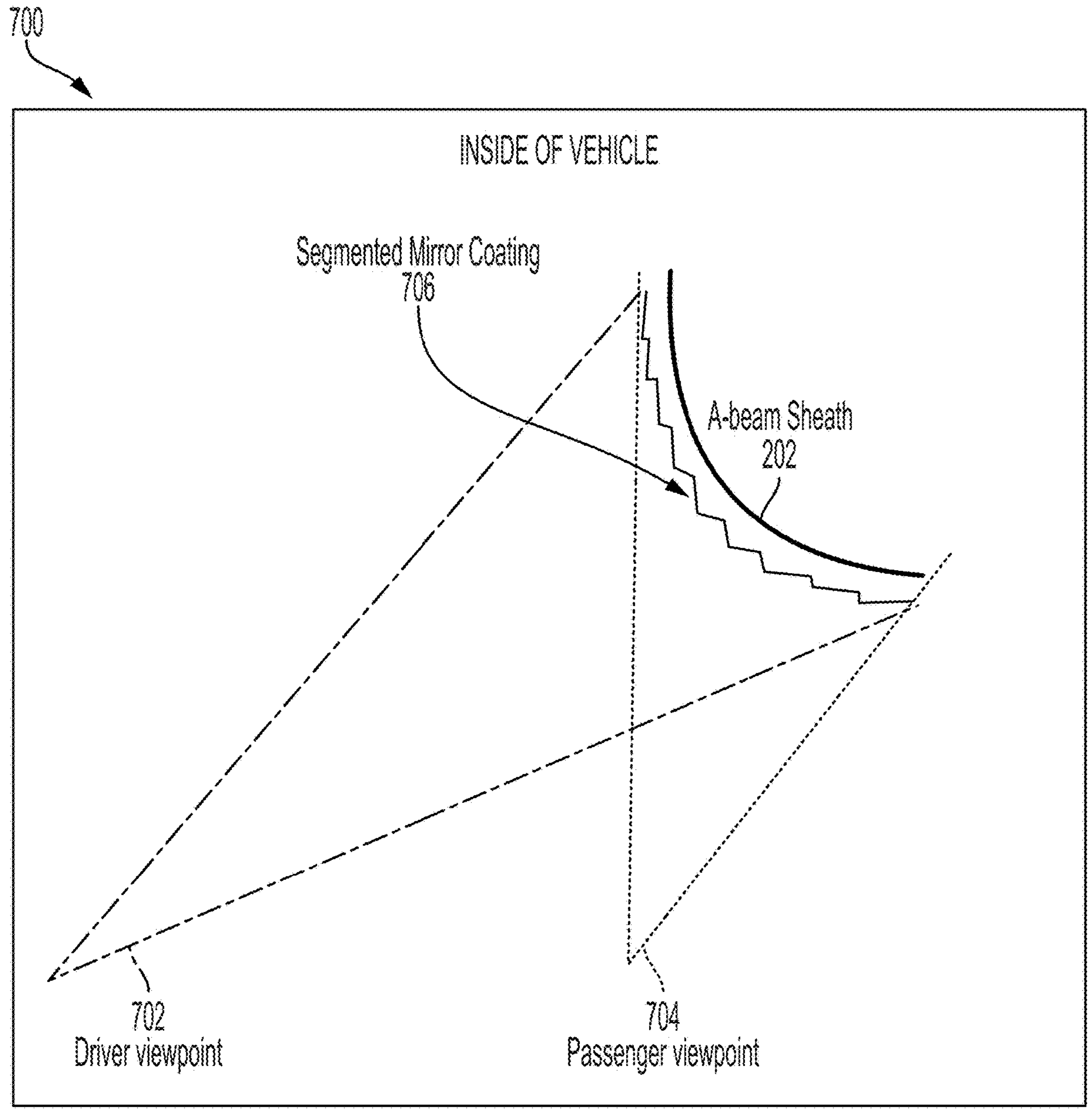
FIG. 7 is an illustration of an example A-beam allowing for a display of the obstructed blind spot from multiple viewpoints according to an aspect of the disclosure.

FIG. 7 is an illustration of an example inside of a vehicle 700 with an A-beam allowing for a display of the obstructed blind spot from multiple viewpoints. The A-beam 202 may be coated with segments, such as a segmented mirror coating 706, to support multi-viewpoint viewing (e.g., viewing the area behind a blind spot for the driver and the area behind a blind spot for the passenger) without distortion. The segments may be angled in such a way that most of the view in a single segment can be displayed to only one viewpoint at a time. For example, there may be one coating segment that displays the area behind the blind spot on the pillar for the driver from a driver viewpoint 702 and then there may be a second coating segment that displays the area behind the blind spot on the pillar for the passenger from a passenger viewpoint 704. For the multi-viewpoint function, multiple images with different distortions or transformations may be projected from the dashboard projector to the segmented mirror, accordingly. In this case, there may be multiple external cameras positioned outside the vehicle to capture the multiple viewpoints and the projector may display multiple transformed images from the images captured from the multiple external cameras. In some aspects, the projector may be a lenticular screen in order to display the multiple images.

In some aspects, instead of the angle of the surface of the pillar supporting multi-viewpoint functionality, reflections can be occluded by an adapted segmented liquid crystal applied on top of the reflective surface.

FIG. 8 depicts an example interior 800 of a vehicle 102 implementing the blind spot projection system 100 of FIG. 1. The interior 800 may include a windshield 802, a dashboard 804, a pillar 808, and a projector 120*b*. The pillar 808 may be a support post on the vehicle 102 that connects the roof of the vehicle 102 to the body of the vehicle 102 on either side of the windshield 802. For example, the pillar 808 may be an A-beam, such as the left A-beam 130*a* or the right A-beam 130*b* of FIG. 1. However, this is not meant to be limiting or required. In other aspects, the pillar 808 may be another pillar of the vehicle, such as the B-beam 204 or C-beam 206 as shown and described in FIG. 2.

The projector 120*b* may receive a transformed image from the ECU 106, such as is described with respect to FIG. 6. From the projector 120*b*, light may be emitted in the form of the transformed image of the blind spot. The projector 120*b* emits the light in the direction of the pillar 808. For example, the projector 120*b* may be positioned horizontally on the dashboard 804 and emit light vertically towards the pillar 808. Optionally, the pillar 808 may be coated in a reflective material to reflect the light from the projector 120*b*. The pillar 808 can reflect and display the image of the area behind the blind spot such that the driver can see the view, via the projected image, from behind the pillar 808.

Figure 9:
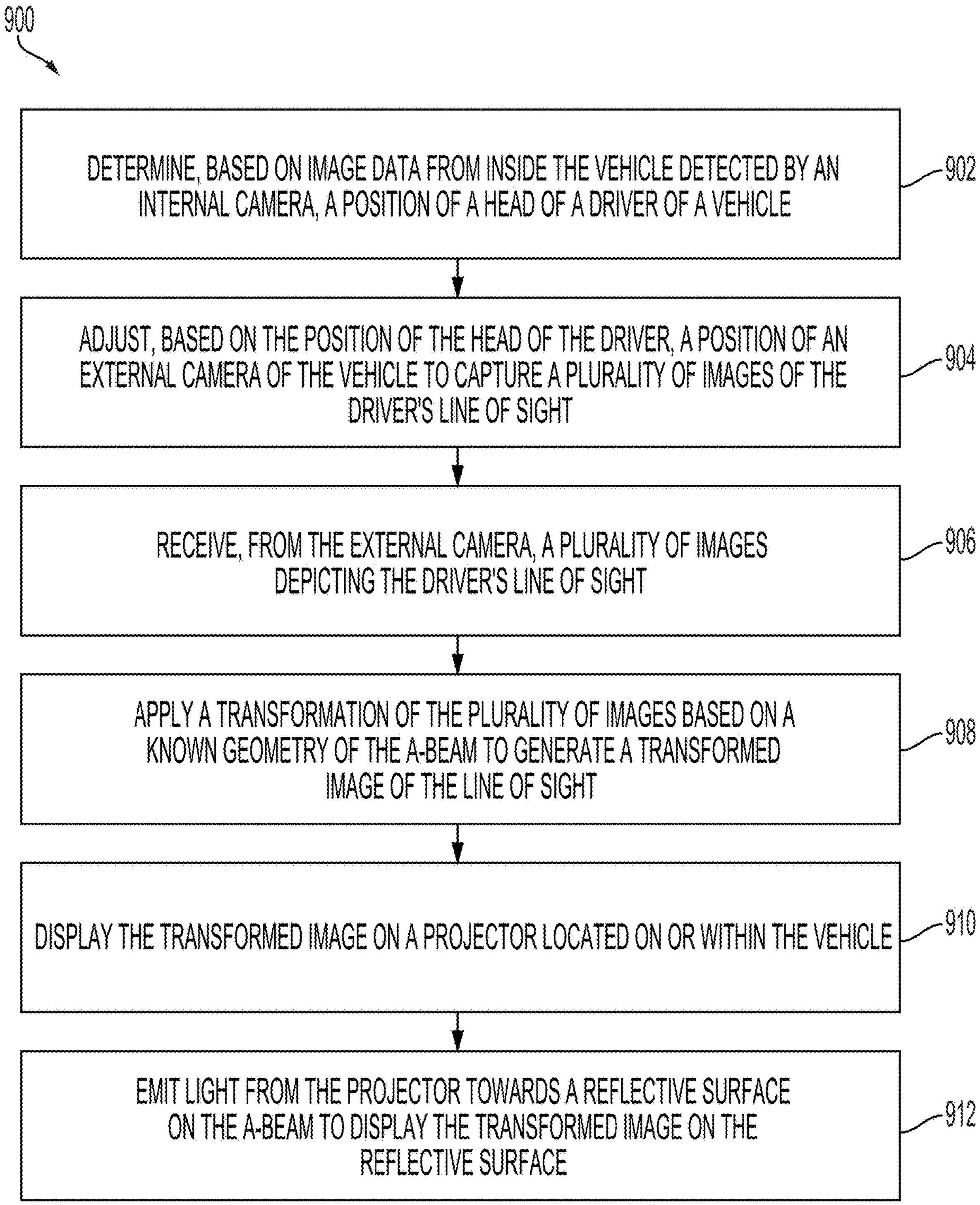
FIG. 9 is a flowchart illustrating a method for displaying an image of an obstructed blind spot on a pillar of a vehicle according to an aspect of the disclosure.

FIG. 9 is a flowchart illustrating an example process 900 for displaying an image of an area behind an obstructed blind spot on an A-beam of a vehicle according to an aspect of the disclosure. One or more computers or one or more data processing apparatuses, for example, the ECU 106 of the blind spot projection system 100 of FIG. 1, appropriately programmed, may implement the process 900. For ease of description, the process 900 is described below with reference to FIGS. 1-8. The process 900 of the disclosure, however, is not limited to use of the exemplary blind spot projection systems of FIGS. 1-8.

The blind spot projection system 100 may determine based on image data from inside the vehicle detected by an internal camera (e.g., the internal camera 116*b*) a position of a head of a driver of a vehicle (902). The blind spot projection system 100 may determine the position of the head or the eye of the driver via the ECU 106. The internal camera may be positioned inside the vehicle opposite the driver such that the internal camera can capture the head or the eye of the driver. The image data may show the driver sitting the vehicle and the height, direction, angle of the driver's head or eyes. The internal camera may include one or more cameras that are capable of tracking the eyes of the driver to determine the line of sight of the driver.

The blind spot projection system 100 may adjust, based on the position of the head or the eyes of the driver, a position of an external camera (e.g., the external camera

116*a*) to capture a plurality of images of the driver's line of sight (904). The external camera may be positioned outside the vehicle 102 and adjacent to or on the external surface of the A-beam or pillar that is creating the blind spot for the driver. The camera angle may be adjusted in order to capture images that are in the blind spot of the driver's field of view. For example, the camera may be adjusted to the right, to the left, up and/or down in order to appropriately capture the area behind the driver's blind spot. The external camera may include one or more cameras that are coupled to the ECU. The external camera may then send the image data to the ECU.

The blind spot projection system 100 may receive, from the external camera, a plurality of images depicting the driver's line of sight (906). The external camera may be configured to capture real-time video data of one or more fields of view of a surrounding area of the vehicle 102. For example, the external camera may capture an upcoming crosswalk outside the vehicle 102 which may be in the driver's line of sight towards the pillar.

The blind spot projection system 100 may apply a transformation of the plurality of images based on a known geometry of the A-beam to generate a transformed image of the line of sight (908). In order to transform the images, the blind spot projection system 100 may utilize a transformation equation to result in an appropriately reflected image on the pillar. The transformation equation may be based on information from the ECU, the shape of the pillar, and the orientation of the projector relative to the pillar.

The blind spot projection system 100 may display the transformed image on a projector located on or within the vehicle (910). The projector may be located adjacent to the pillar. For example, the projector may be positioned on a dashboard of the vehicle below the pillar and be oriented towards the pillar so that the transformed image that is displayed on the projector is reflected off the pillar. Optionally, the transformed image may depict augmented reality or custom patterns or images.

The blind spot projection system 100 may emit light from the projector towards a reflective surface on the A-beam to display the transformed image on the reflective surface (912). The A-beam may be coated with the reflective surface. In examples, the reflective surface may be a cholesteric liquid crystal material. In other examples, the reflective surface may be a digitally controllable mirror that can be turned on and off as desired. Optionally, as shown and described in FIG. 7, the reflective surface may be a multifaceted segment coating which reflects portions of the display to one or another viewpoint based on a segment angle. Therefore, multiple images with different distortions or transformations may be projected from the projector. However, this is not meant to be limiting or required, as other materials or coatings may be possible for the reflective surface of the a-beam. In other examples, the A-beam may be painted with a reflective surface. Still in other examples, the A-beam may not be coated and/or painted with a material and may instead reflect the image from the projector without utilizing a reflective coating.

Once the transformed image is reflected and/or displayed on the A-beam, the driver can view on the A-beam the area behind the blind spot created by the pillar. Therefore, the pillar may appear to be virtually transparent and eliminating the blind spot for the driver.

Exemplary aspects or embodiments of the invention have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such aspects or embodiments that reasonably fall within the scope of the advancement to the art hereby contributed, and that that scope shall not be restricted, except in light of the appended claims and their equivalents.

What is claimed is:

1. A system for displaying an image of an obstructed blind spot on a pillar connecting a roof to a body of a vehicle, the system comprising:
- an internal camera configured to detect a position of a head of a driver of the vehicle;
- an external camera configured to detect image data from around the vehicle;
- a projector positioned on a dashboard of the vehicle and located adjacent to and underneath the pillar, the projector being oriented towards the pillar and configured to beam light upwards in the form of an image onto an inside surface of the pillar; and
- an electronic control unit (ECU) configured to:
  - determine, from the internal camera, the position or view of a head or eyes of the driver of the vehicle;
  - adjust, based on the position or view of the head or the eyes of the driver, the external camera to capture a plurality of images of an area of a blind spot of the driver;
  - receive, from the external camera, a plurality of images depicting the area of the blind spot of the driver;
  - apply a transformation of the plurality of images based on a known geometry of the pillar and an orientation of the projector relative to the pillar to generate a transformed image of the blind spot, the transformation distorting the plurality of images to accommodate a shape of the pillar; and
  - control the projector to emit light in the form of the transformed image towards the pillar to display the transformed image, the transformed image being displayed on the pillar showing the blind spot behind the pillar when viewing the pillar.

2. The system of claim 1, wherein the internal camera is positioned inside the vehicle opposite the driver and comprises one or more cameras capable of tracking the eyes of the driver to determine the position of the head of the driver.

3. The system of claim 1, wherein the external camera is positioned outside the vehicle adjacent to the pillar and comprises one or more cameras coupled to the ECU and configured to capture real-time video data of one or more fields of view of a surrounding area of the vehicle.

4. The system of claim 1, wherein the pillar is coated with a reflective surface.

5. The system of claim 4, wherein the reflective surface is a cholesteric liquid crystal material.

6. The system of claim 4, wherein the reflective surface is a multifaceted segment coating which reflects portions of the display to one or another viewpoint based on a segment angle and multiple images with different distortions or transformations may be projected from the projector.

7. The system of claim 1, wherein display of the transformed image can be turned on and off as desired.

8. The system of claim 1, wherein the projector displays a pattern to match the pillar when the pillar is not functioning as a blind spot removal device.

9. The system of claim 1, wherein to apply the transformation of the plurality of images to generate the transformed image of the blind spot is further based on information from the ECU and the shape of the pillar.

10. The system of claim 1, wherein the ECU is further configured to control the projector to display augmented reality on the transformed image.

11. The system of claim 1, wherein the ECU is further configured to control the projector to display custom patterns or custom images on the transformed image, the custom images comprising a video feed of a passenger of the vehicle.

12. A method for displaying an image of a line of sight of a driver on an A-beam of a vehicle, the method comprising:

determining, based on image data from inside the vehicle detected by an internal camera, a position of a head of the driver of the vehicle;

adjusting, based on the position of the head of the driver, a position of an external camera to capture a plurality of images of the line of sight of the driver, wherein the external camera is configured to detect image data from outside the vehicle;

receiving, from the external camera, a plurality of images depicting the line of sight;

applying a transformation of the plurality of images based on a known geometry of the A-beam and an orientation of the projector relative to the A-beam to generate a transformed image of the line of sight, the transformation distorting the plurality of images to accommodate a shape of the A-beam;

displaying the transformed image on a projector positioned on a dashboard of the vehicle and located adjacent to and underneath the A-beam, the projector being oriented towards the A-beam and configured to beam light upwards in the form of an image onto an inside surface of the A-beam; and emitting light from the projector towards a reflective surface on the A-beam to display the transformed image on the reflective surface such that, when viewing the A-beam, an image depicting the line of sight behind the A-beam is shown on the reflective surface.

13. The method of claim 12, wherein the internal camera is positioned inside the vehicle opposite the driver and comprises one or more cameras capable of tracking the eyes of the driver to determine the position of the head of the driver.

14. The method of claim 12, wherein the external camera is positioned outside the vehicle adjacent to the a-beam and comprises one or more cameras configured to capture real-time video data of one or more fields of view of a surrounding area of the vehicle.

15. The method of claim 12, wherein the A-beam is coated with the reflective surface.

16. The method of claim 12, wherein the projector emits the transformed image to be reflected off the A-beam.

17. The method of claim 12, wherein to apply the transformation of the plurality of images to generate the transformed image of the line of sight is further based on information from an electronic control unit (ECU) and the shape of the A-beam.

18. A vehicle including a system for displaying an image of an obstructed blind spot on an A-beam of the vehicle, the vehicle comprising:

an internal camera configured to detect a position of a head or an eye of a driver;

an external camera configured to detect image data from around the vehicle;

an A-beam connecting a roof of the vehicle to a body of the vehicle, the A-beam being coated with a reflective surface;

a projector positioned on a dashboard of the vehicle and adjacent to and underneath the A-beam, the projector being oriented towards the A-beam and configured to beam light upwards in the form of an image onto an inside surface of the A-beam; and an electronic control unit (ECU) configured to:

determine, from the internal camera, the position of the head or the eye of a driver of the vehicle;

adjust, based on the position of the head of the driver, the external camera to capture a plurality of images of an area of a blind spot of the driver;

receive, from the external camera, a plurality of images depicting the area of the blind spot of the driver;

apply a transformation of the plurality of images based on a known geometry of the A-beam and an orientation of the projector relative to the A-beam to generate a transformed image of the blind spot, the transformation distorting the plurality of images to accommodate a shape of the A-beam; and control the projector to emit light towards the reflective surface of the A-beam to display the transformed image on the reflective surface, wherein when viewing the A-beam, the image behind the blind spot is shown on the reflective surface of the A-beam.

19. The vehicle of claim 18, wherein the projector emits the transformed image to be reflected off the reflective surface of the A-beam.

20. The vehicle of claim 18, wherein to apply the transformation of the plurality of images to generate the transformed image of the blind spot is further based on information from the ECU and the shape of the A-beam.

* * * * *